(12) United States Patent
Ramsay

(10) Patent No.: US 9,880,321 B2
(45) Date of Patent: Jan. 30, 2018

(54) DEFINING NON-LINEAR PETROFACIES FOR A RESERVOIR SIMULATION MODEL

(71) Applicant: Landmark Graphics Corporation, Houston, TX (US)

(72) Inventor: Travis St. George Ramsay, Hockley, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/780,471

(22) PCT Filed: Dec. 8, 2014

(86) PCT No.: PCT/US2014/069132
§ 371 (c)(1),
(2) Date: Sep. 25, 2015

(87) PCT Pub. No.: WO2016/093794
PCT Pub. Date: Jun. 16, 2016

(65) Prior Publication Data
US 2017/0269261 A1      Sep. 21, 2017

(51) Int. Cl.
*G06G 7/48*      (2006.01)
*G01V 99/00*     (2009.01)
(Continued)

(52) U.S. Cl.
CPC .............. *G01V 99/005* (2013.01); *G01V 1/28* (2013.01); *G06F 17/11* (2013.01); *G06F 17/5018* (2013.01)

(58) Field of Classification Search
CPC . G01V 1/28; G01V 1/003; G01V 1/30; G01V 3/28; G01V 1/50; G06F 17/5018; E21B 43/00
See application file for complete search history.

(56) References Cited

U.S. PATENT DOCUMENTS

2005/0021234 A1    1/2005  Han
2010/0185393 A1*   7/2010  Liang ................. G01V 3/28
                                                   702/7
(Continued)

FOREIGN PATENT DOCUMENTS

WO     WO 2014/078891 A1 *  5/2014
WO     WO-2014092712 A1     6/2014
(Continued)

OTHER PUBLICATIONS

International Search Report and Written Opinion, dated Aug. 13, 2015, 9 pages; Korean International Searching Authority.

*Primary Examiner* — Kandasamy Thangavelu

(57) ABSTRACT

System and methods for defining non-linear petrofacies for a reservoir simulation model are provided. A cross-plot visualization of selected petrophysical properties from a three-dimensional (3D) geocellular grid array of petrophysical properties representing a reservoir rock formation is presented to a user via a display of a computing device. Upon receiving user input for defining a non-linear petrofacies region of the 3D geocellular grid within the presented cross-plot visualization, data points in the cross-plot visualization that are within the boundaries of the petrofacies region are identified. The identified data points are associated with the petrofacies region. Hydraulic rock properties are assigned to one or more cells of the 3D geocellular grid based on the data points associated with the petrofacies region.

20 Claims, 8 Drawing Sheets

(51) Int. Cl.
    *G06F 17/11*     (2006.01)
    *G06F 17/50*     (2006.01)
    *G01V 1/28*     (2006.01)

(56) References Cited

U.S. PATENT DOCUMENTS

| | | | |
|---|---|---|---|
| 2011/0295510 A1* | 12/2011 | Gulati | G01V 1/28 702/16 |
| 2012/0232865 A1* | 9/2012 | Maucec | G01V 1/30 703/2 |
| 2013/0073268 A1 | 3/2013 | Abacioglu et al. | |
| 2013/0218538 A1* | 8/2013 | Fuecker | G06F 17/5018 703/2 |
| 2013/0338984 A1 | 12/2013 | Braaksma et al. | |
| 2014/0114892 A1 | 4/2014 | Quirein et al. | |
| 2015/0043787 A1* | 2/2015 | Fredrich | G06F 17/5018 382/109 |
| 2015/0073715 A1* | 3/2015 | Aarre | G01V 1/003 702/14 |
| 2015/0338550 A1* | 11/2015 | Wadsley | E21B 43/00 703/2 |
| 2015/0355374 A1* | 12/2015 | Morton | G01V 1/50 703/10 |

FOREIGN PATENT DOCUMENTS

| | | |
|---|---|---|
| WO | WO 2014/116896 A1 * | 7/2014 |
| WO | WO-2015023265 A1 | 2/2015 |
| WO | WO-2015038163 A1 | 3/2015 |

\* cited by examiner

DEFINING NON-LINEAR PETROFACIES FOR A RESERVOIR SIMULATION MODEL

CROSS-REFERENCE TO RELATED APPLICATIONS

This application is a U.S. National Stage patent application of International Patent Application No. PCT/US2014/069132, filed on Dec. 8, 2014, the benefit of which is claimed and the disclosure of which is incorporated herein by reference in its entirety.

FIELD OF THE DISCLOSURE

The present disclosure relates generally to reservoir simulation modeling, and particularly, to petrofacies analysis techniques for assigning rock types in a reservoir simulation model.

BACKGROUND

Knowing the properties and locations of underground rock formations is useful for making decisions as to where and how to economically produce hydrocarbons from the subsurface. In particular, an asset team making development and production decisions may encounter various rock types in an underground formation, where each rock type may be comprised of petrophysical and hydraulic rock properties describing composition, structure, and multiphase fluid flow characteristics. For example, a section of an underground formation may be comprised of the following different rock types: sandstone; carbonate; and shale, where each rock type has rock properties that differ from one another and vary within each classification.

In order to ascertain information regarding the underground reservoir formation, rock properties for each rock type of the formation may be measured and subsequently recorded in a well log. Well logging is a technique used to identify properties associated with earth formations immediately surrounding a wellbore. The interrogation of a formation surrounding a wellbore to identify one or more property of a rock type may be by, for example, sound, electrical current, electromagnetic waves, or high energy nuclear particles (e.g., gamma particles and neutrons). A geologist can use the aggregated rock properties within a well log to make a determination of geologic rock types surrounding the associated well. This information can then be used to generate static three-dimensional (3D) geocellular models of the underground formation. The simulation of fluid flow dynamically within the geocellular model by a reservoir engineer requires a description of hydraulic conductivity for each modeled rock type in order to properly depict rock-fluid interaction in the dynamic model. Rock-fluid interaction is typically measured as multiphase relative permeability using core samples obtained from the wellbore that are representative of the drilled formation. The coupling of static model construction and dynamic modeling then allows the assessment of a formation's potential for production of hydrocarbon deposits, such as oil and natural gas.

As rock properties are measured only within a limited radius around the well in which measurements are taken, the determination as to the rock type may apply to only a small portion of the underground formation within a limited distance from the well (based on the measurements obtained from the well logs). Consequently, a 3D model of the underground formation as a whole may require the rock type determined for one portion of the formation to be applied to other portions for which measurements were not taken, e.g., portions of the formation located between a well and a nearby offset well, as if the rock type were a regionalized variable.

For a more accurate distribution of rock types in the 3D model of the formation, the geologist or reservoir engineer may define petrofacies as different regions of the 3D model according to specified ranges of selected petrophysical properties (e.g., porosity and absolute permeability). Hydraulic rock type properties, such as relative permeability and capillary pressure, may be assigned to relevant portions of the 3D model according to the defined petrofacies. The petrofacies definitions may be validated against previously derived seismic attribute data (typically in the form of acoustic impedance). However, such conventional techniques for defining petrofacies based on specified petrophysical property ranges presuppose that the relationships between petrophysical properties are defined by rigid rock property cutoffs and/or that linear petrofacies relationships are to be enforced. As the hydraulic rock type properties of the actual formation generally are not distributed according to such linear petrofacies relationships, the resulting 3D model may not provide an accurate representation of the fluid flow characteristics and heterogeneity of the formation being modeled.

DESCRIPTION OF ILLUSTRATIVE EMBODIMENTS

Figure 1:
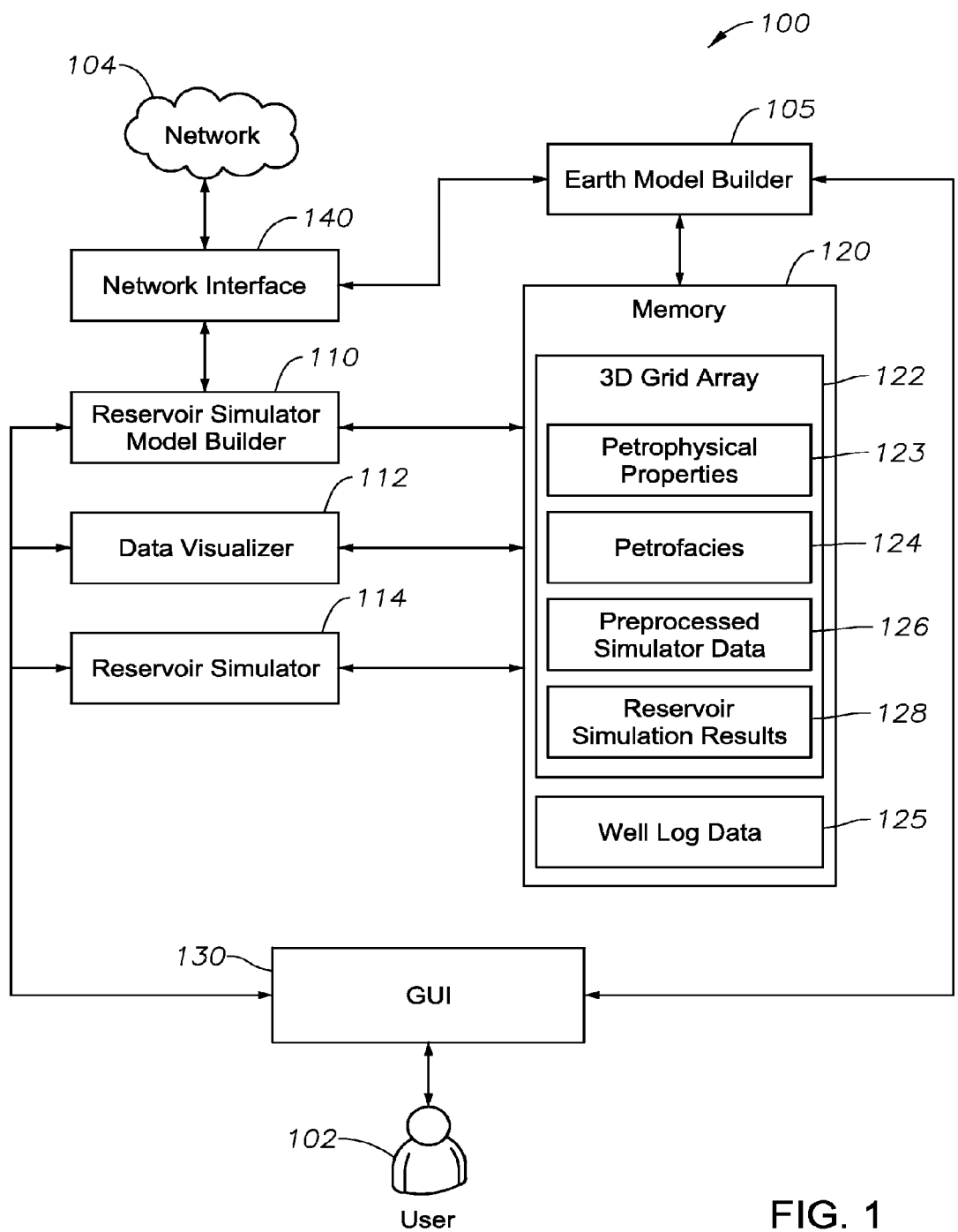
FIG. 1 is a block diagram of an exemplary system for defining non-linear petrofacies in a reservoir simulation model.

Embodiments of the present disclosure relate to defining non-linear petrofacies regions for a reservoir simulation model. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It would also be apparent to one skilled in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

The term "petrofacies" is used herein to refer to a range of petrophysical rock properties that may be attributed to a particular rock type. The term "petrophysical properties" is used herein to refer to any of various physical and/or chemical properties of different rocks. A petrophysical property of a rock type may represent, for example, a common physical feature or measured value shared by rocks of that type. Examples of petrophysical properties include, but are not limited to, porosity, permeability, gamma ray, resistivity, lithology, and density. Values for such petrophysical properties may be derived from measurements taken from various data sources including, for example, well logs. The measurements in a well log may include, for example, gamma radiation readings, sonic velocity (speed of sound through the rock), acoustic impedance, and other seismic data.

As noted above, embodiments of the present disclosure relate to defining non-linear petrofacies regions for a reservoir simulation model. Embodiments may be used, for example, to assign hydraulic rock properties, e.g., in the form of hydraulic rock types or rock type flow units, to a reservoir simulation model according to defined petrofacies regions for purposes of executing a reservoir simulation using the model. Each petrofacies region may be defined according to non-linear relationships between selected petrophysical properties of a reservoir rock formation represented by the model. In one embodiment, a cross-plot visualization of selected petrophysical properties is presented to a user via a display of a computing device. The cross-plot visualization may include a plurality of data points corresponding to values of the selected petrophysical properties, as they are assigned to each of the various cells in a three-dimensional (3D) geocellular grid representing the formation. The cross-plot visualization may be presented within, for example, a graphical user interface (GUI) of a reservoir simulation application. Non-linear relationships between the petrophysical properties may be captured based on input received from the user via the GUI. For example, the user may specify such a non-linear relationship by drawing a circular shape or polygon around selected data points directly within the cross-plot visualization. A rock type or petrofacies may be defined as a region of the 3D geocellular grid according to the non-linear relationship specified by the user within the cross-plot visualization. Hydraulic rock properties, e.g., relative permeability and/or capillary pressure, may then be assigned to one or more cells of the 3D geocellular grid according to the defined petrofacies region.

Illustrative embodiments and related methodologies of the present disclosure are described below in reference to FIGS. 1-8 as they might be employed, for example, in a computer system for modeling petrophysical properties of a reservoir rock formation and simulating the flow of fluids (e.g., oil and/or water) through the formation. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a block diagram of an exemplary system 100 for defining non-linear petrofacies in a reservoir simulation model. As shown in FIG. 1, system 100 includes an earth model builder 105, a reservoir simulator model builder 110, a data visualizer 112, a reservoir simulator 114, a memory 120, a graphical user interface (GUI) 130, and a network interface 140. In an embodiment, earth model builder 105, reservoir simulator model builder 110, data visualizer 112, reservoir simulator 114, memory 120, GUI 130, and network interface 140 may be communicatively coupled to one another via an internal bus of system 100.

In an embodiment, system 100 can be implemented using any type of computing device having at least one processor and a processor-readable storage medium for storing data and instructions executable by the processor. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by each computing device to output or present information to a user via an output device (not shown). The output device may be, for example, a display coupled to or integrated with the computing device for displaying a digital representation of the information being presented to the user. Examples of such a computing device include, but are not limited to, a mobile phone, a personal digital assistant (PDA), a tablet computer, a laptop computer, a desktop computer, a workstation, a cluster of computers, a set-top box, or similar type of computing device.

Although only earth model builder 105, reservoir simulator model builder 110, data visualizer 112, reservoir simulator 114, memory 120, GUI 130, and network interface 140 are shown in FIG. 1, it should be appreciated that system 100 may include additional components, modules, and/or sub-components as desired for a particular implementation. It should also be appreciated that each of earth model builder 105, reservoir simulator model builder 110, data visualizer 112, and reservoir simulator 114 may be implemented in software, firmware, hardware, or any combination thereof. Furthermore, it should be appreciated that embodiments of earth model builder 105, reservoir simulator model builder 110, data visualizer 112, and reservoir simulator 114, or portions thereof, can be implemented to run on any type of processing device including, but not limited to, a computer, workstation, embedded system, networked device, mobile device, or other type of processor or computer system capable of carrying out the functionality described herein.

As will be described in further detail below, memory 120 can be used to store information accessible by each of earth model builder 105, reservoir simulator model builder 110, data visualizer 112, and reservoir simulator 114 for implementing the functionality of the present disclosure. Memory 120 may be any type of recording medium coupled to an integrated circuit that controls access to the recording medium. The recording medium can be, for example and without limitation, a semiconductor memory, a hard disk, or similar type of memory or storage device. In some implementations, memory 120 may be a remote data store, e.g., a cloud-based storage location, communicatively coupled to system 100 over a network 104 via network interface 140. Network 104 can be any type of network or combination of networks used to communicate information between different computing devices. Network 104 can include, but is not limited to, a wired (e.g., Ethernet) or a wireless (e.g., Wi-Fi or mobile telecommunications) network. In addition, network 104 can include, but is not limited to, a local area network, medium area network, and/or wide area network such as the Internet.

As shown in FIG. 1, memory 120 may be used to store a 3D geocellular grid array (hereinafter, "3D grid array") 122 and well log data 125. 3D grid array 122 may be, for example, a 3D model of an underground reservoir rock formation. Such a model may be used to approximate the physical structure of the rock formation in 3D space. In an embodiment, 3D grid array 122 may comprise a 3D mesh of cells or tessellations that collectively represent a predetermined volume corresponding to the rock formation or relevant portion thereof. The location of each cell within 3D grid array 122 may correspond to a physical location of the portion of the underground rock formation represented by that cell relative to the formation as a whole. The cells may have equal or varying volumes and shapes, as desired for a particular implementation. As will be described in further detail below, each cell of 3D grid array 122 may be stored in association with data for one or more petrophysical properties 123 of the rock formation, definitions of one or more petrofacies 124, preprocessed simulator data 126, and reservoir simulation results 128.

In an embodiment, 3D grid array 122 may be generated by earth model builder 105 using well log data 125. Well log data 125 may include, for example, data relating to various geological and petrophysical properties of the underground rock formation based on one or more well logs, as described above. Such data may include, for example and without limitation, values of porosity and absolute permeability measured for different areas of the rock formation. In an embodiment, earth model builder 105 may use well log data 125 read from memory 120 to derive petrophysical properties 123, and then distribute petrophysical properties 123 as attributes throughout 3D grid array 122.

In some implementations, petrophysical properties 123 may be constrained in 3D grid array 122 with respect to one or more depositional facies representing the depositional structure of the geological rock formation. This depositional facies may be controlled spatially, for example, by lithotype proportions (e.g., a vertical proportion matrix) generated for 3D grid array 122. The lithotype proportion map may include lithology curves representing the facies proportions and lithotypes (or "grouped facies") locally for every cell in each layer throughout 3D grid array 122. The lithotype proportion map may be used to introduce secondary information, e.g., various trends, in the data to enable better control over facies boundary conditions. Multiple facies simulations may be computed using, for example, stochastic or other appropriate simulation techniques.

After facies modeling and simulation are completed, petrophysical property modeling may be executed for 3D grid array 122 with well log data 125 (e.g., values of porosity and absolute permeability) using the depositional facies as a spatial constraint. In an embodiment, each cell of 3D grid array 122 may be assigned a value for each of one or more types well log data 125 corresponding to the portion of the underground rock formation represented by that cell, thereby creating an assignment of appropriate petrophysical properties 123 to respective cells in 3D grid array 122. Each cell of 3D grid array 122 may also include, for example, data indicating the cell's relative location in 3D grid array 122 based on the portion of the underground rock formation represented by the cell. While 3D grid array 122 in this example is described as being stored in memory 120 in the form of an array, it should be appreciated that embodiments of the present disclosure are not intended to be limited thereto and that the disclosed embodiments may be applied to 3D geocellular grids in any of various data storage and/or processing formats.

In an embodiment, the values assigned to each cell of 3D grid array 122 may be based on, for example, the analysis of the well log data 125 performed by earth model builder 105. In some implementations, earth model builder 105 may perform probabilistic uncertainty analysis using one or more realizations of facies and/or petrophysical properties 123 and allowing the user to select any value or set of values to be used for subsequent analysis, e.g., for purposes of flow simulation. Probability maps may also be generated and visualized based on thresholds defined by any value or for a range of values. Further, stochastic volumetric calculations can be derived generating a variety of useful metrics including, for example and without limitation, pore volume, original hydrocarbons in place, and recoverable hydrocarbons. However, it should be appreciated that any of various data analysis techniques may be used to determine the appropriate petrophysical property values that are to be assigned to each cell of 3D grid array 122. Examples of such other techniques include, but are not limited to, interpolation, simulation, and other geostatistical techniques. It should also be appreciated that the data analysis for determining such values may be performed using data analysis tools, which may be executable as a separate component (not shown) of system 100 than earth model builder 105. In some implementations, such a data analyzer component may be included as part of data visualizer 112 for purposes of visualizing petrophysical properties 123 associated with each cell of 3D grid array 122 and categorizing non-linear petrofacies relationships between the visualized properties based on user input, as will be described in further detail below. Such a data analyzer/visualizer may be utilized by both earth model builder 105 and reservoir simulator model builder 110, e.g., for implementing portions of the disclosed embodiments in separate workflows for earth modeling and reservoir simulation, respectively.

In an embodiment, reservoir simulator model builder 110 may use data visualizer 112 to present to a user 102 a cross-plot visualization of desired petrophysical properties selected from the petrophysical properties 123 associated with 3D grid array 122 via GUI 130. As will be described in further detail below, the cross-plot visualization may be presented within, for example, a visualization window of GUI 130 that may be rendered to a display (not shown) of system 100. The display may be, for example and without limitation, a cathode ray tube (CRT) monitor, a liquid crystal display (LCD), or a touch-screen display, e.g., in the form of a capacitive touch-screen light emitting diode (LED) display.

Figure 2:
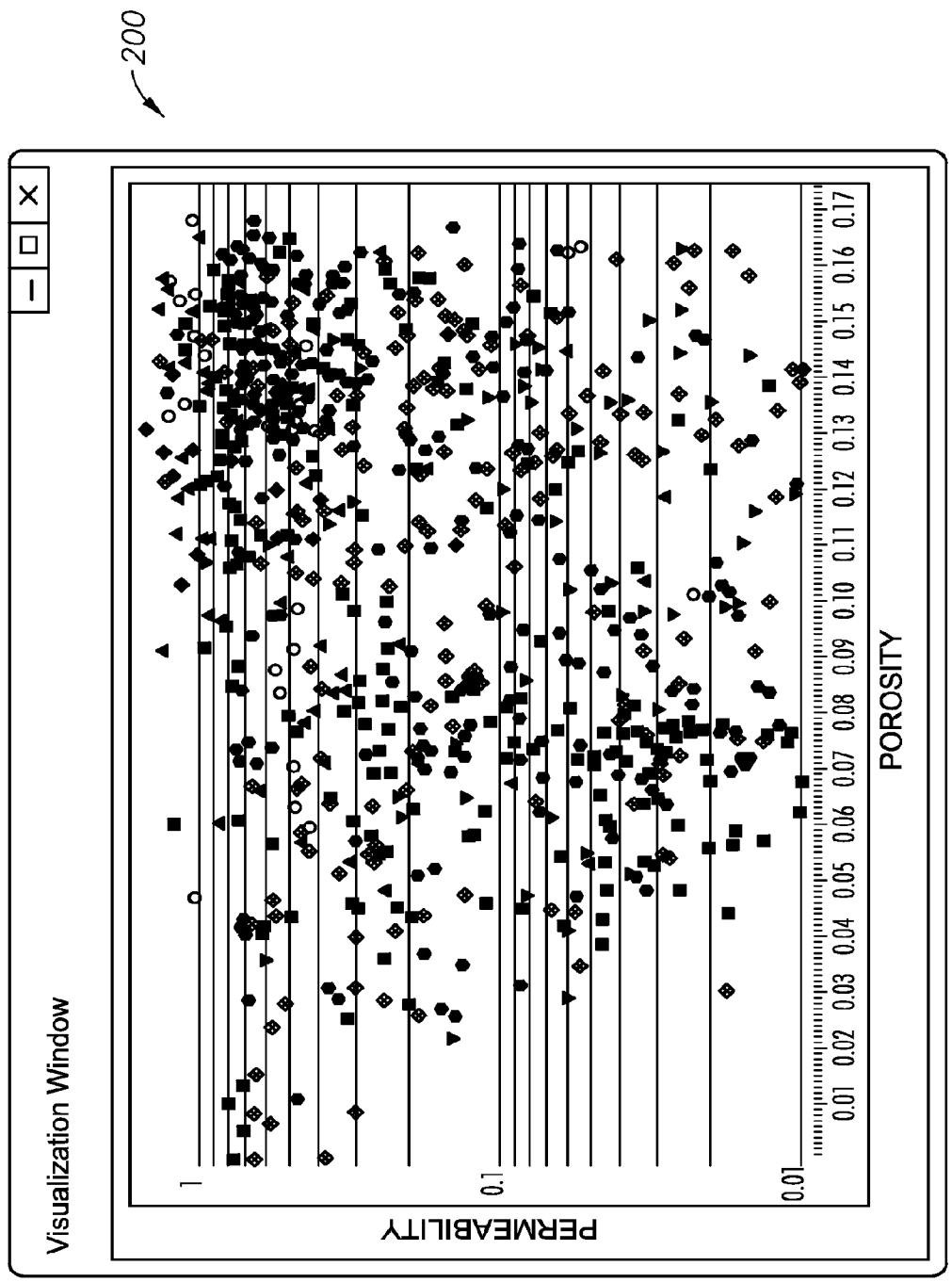
FIG. 2 illustrates an exemplary cross-plot visualization of selected petrophysical properties presented within an interactive window of a graphical user interface (GUI).

An example of such a cross-plot visualization is illustrated in FIG. 2, which shows a cross-plot visualization 200 with values for permeability plotted on the y-axis and values for porosity plotted on the x-axis. As shown in FIG. 2, the cross-plot visualization may include a plurality of data points representing the values of the selected petrophysical properties, e.g., permeability and porosity values assigned to each of the cells of 3D grid array 122. In some implementations, a color scheme may be applied to the data points of each cross-plot to denote intervals of values for a specified property according to a color gradient. However, it should be appreciated that such value intervals may be denoted using any of various other visualization techniques (e.g., applying different shapes or patterns to the data points), which may be applied to cross-plot visualization instead of or in addition to a color scheme.

In an embodiment, GUI 130 enables user 102 to interact directly with the cross-plot visualization in order to identify non-linear relationships between the petrophysical properties and define categories of petrofacies 124 for 3D grid array 122 according to the identified non-linear relationships. For example, user 102 may use a user input device (e.g., a mouse, keyboard, microphone, or touch-screen) to define a non-linear petrofacies 124 as a region of 3D grid array 122 by selecting a group of data points within an area of the cross-plot visualization to be associated with the non-linear petrofacies region. In an embodiment, petrophysical properties 123 and user-defined petrofacies 124 may be used by reservoir simulator model builder 110 to generate a reservoir simulation deck or instructions for reservoir simulator 114 to perform numerical flow simulation. Reservoir simulator 114 may reinterpret or convert the petrophysical properties 123 data of 3D grid array 122 into preprocessed simulator data 126. In some implementations, a separate data preprocessor (not shown) may be used for preprocessing the petrophysical data and storing the preprocessed data in memory 120 to be used as input for reservoir simulator 114. Preprocessed simulator data 126 may include, for example, cell connectivity, transmissibility, and pore volume arrays for the numerical flow simulation to be performed. The results of the numerical flow simulation performed by reservoir simulator 114 may be stored in association with 3D grid array 122 in memory 120 as reservoir simulation results 128. Reservoir simulation results 128 may be stored as, for example, time-dependent flow simulation data associated with each cell of 3D grid array 122 in memory 120.

As will be described in further detail below with respect to FIGS. 3-6, GUI 130 may provide user 102 with different options for defining a non-linear petrofacies region according to selected data points within a cross-plot visualization of selected petrophysical properties. FIGS. 3-6 may illustrate, for example, different views of cross-plot visualization 200 of FIG. 2, in which user 102 has defined one or more non-linear petrofacies regions via GUI 130 by using different data point selection techniques to associate selected data points in an area of the cross-plot visualization with each non-linear petrofacies region being defined, as described above. This allows user 102 to define each petrofacies region according to the non-linear relationship between the selected petrophysical properties, as represented by the user-selected data points associated with that region. While the examples provided in FIGS. 2-6 illustrate cross-plot visualizations of permeability and porosity values, it should be appreciated that embodiments of the present disclosure are not intended to be limited thereto and that the disclosed embodiments may be applied to other types of petrophysical, rock physics, and/or time dependent data properties.

Figure 3:
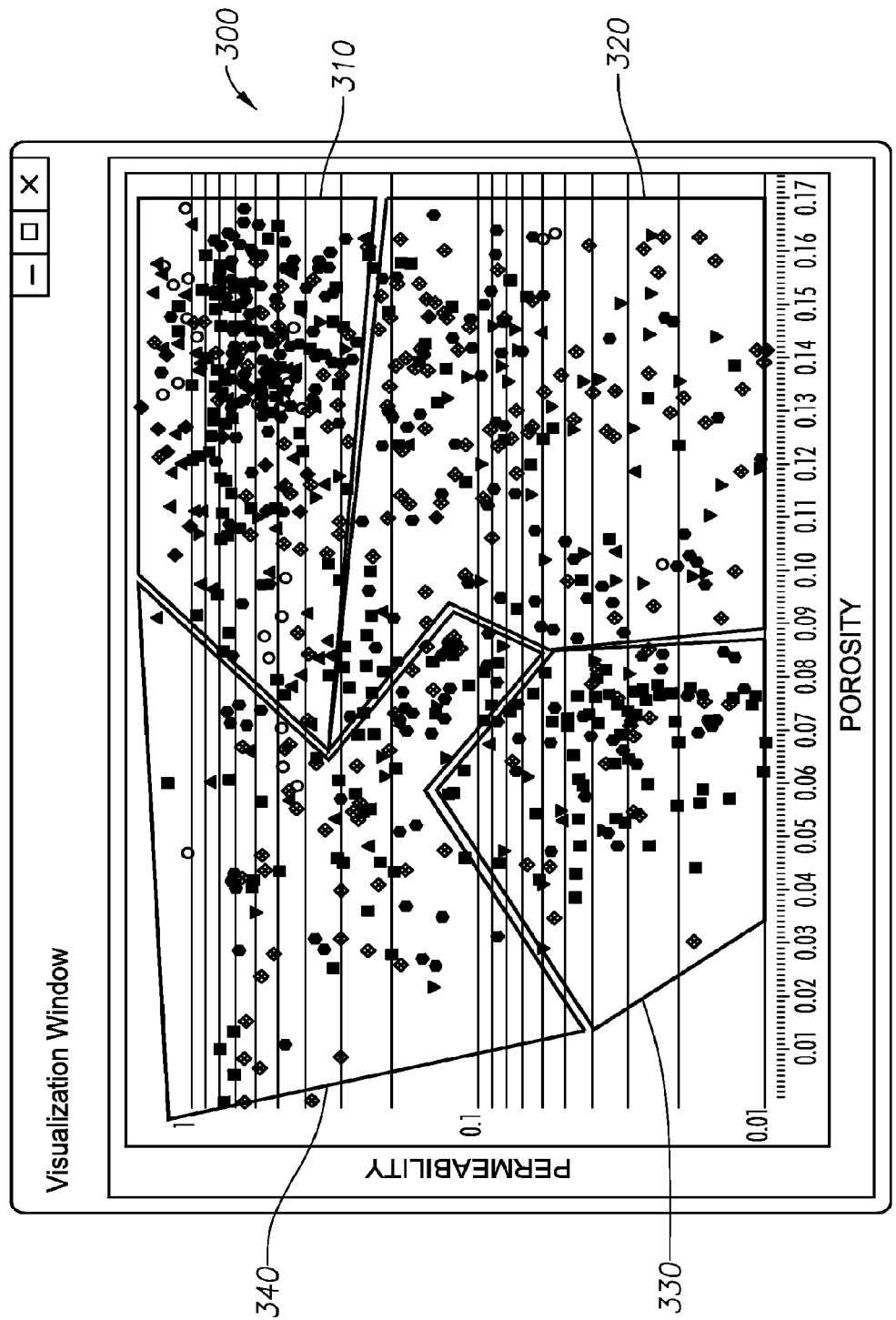
FIG. 3 illustrates an exemplary view of the cross-plot visualization of FIG. 2, in which non-linear petrofacies are defined according to polygons drawn by a user via the GUI.

FIG. 3 illustrates an exemplary cross-plot visualization 300 for defining non-linear petrofacies regions according to polygons drawn by a user via a GUI (e.g., GUI 130 of FIG. 1, as described above). In the example shown in FIG. 3, cross-plot visualization 300 includes different data point selection areas 310, 320, 330, and 340. Each data point selection area may correspond to a polygon drawn by the user directly within cross-plot visualization 300. In an embodiment, the user may be required to draw a polygon, or any shape having at least three sides, in order for the drawn polygon/shape to be recognized by the GUI as a valid selection area within cross-plot visualization 300. While the size of a polygon drawn for a selection area may be irrelevant, the polygon may have to include at least two data points to qualify as a valid selection area. In some implementations, a default selection area may be generated automatically within cross-plot visualization 300 to serve, for example, as a "catch all" for any remaining data points that are not already included within an existing selection area drawn by the user. For example, selection area 340 may be such a default selection area, which may have been drawn automatically within cross-plot visualization 300 after the user had finished drawing the polygons corresponding to selection areas 310, 320, and 330. The data points included within such a default selection area may be excluded or treated as a separate and distinct flow regime.

Figure 4:
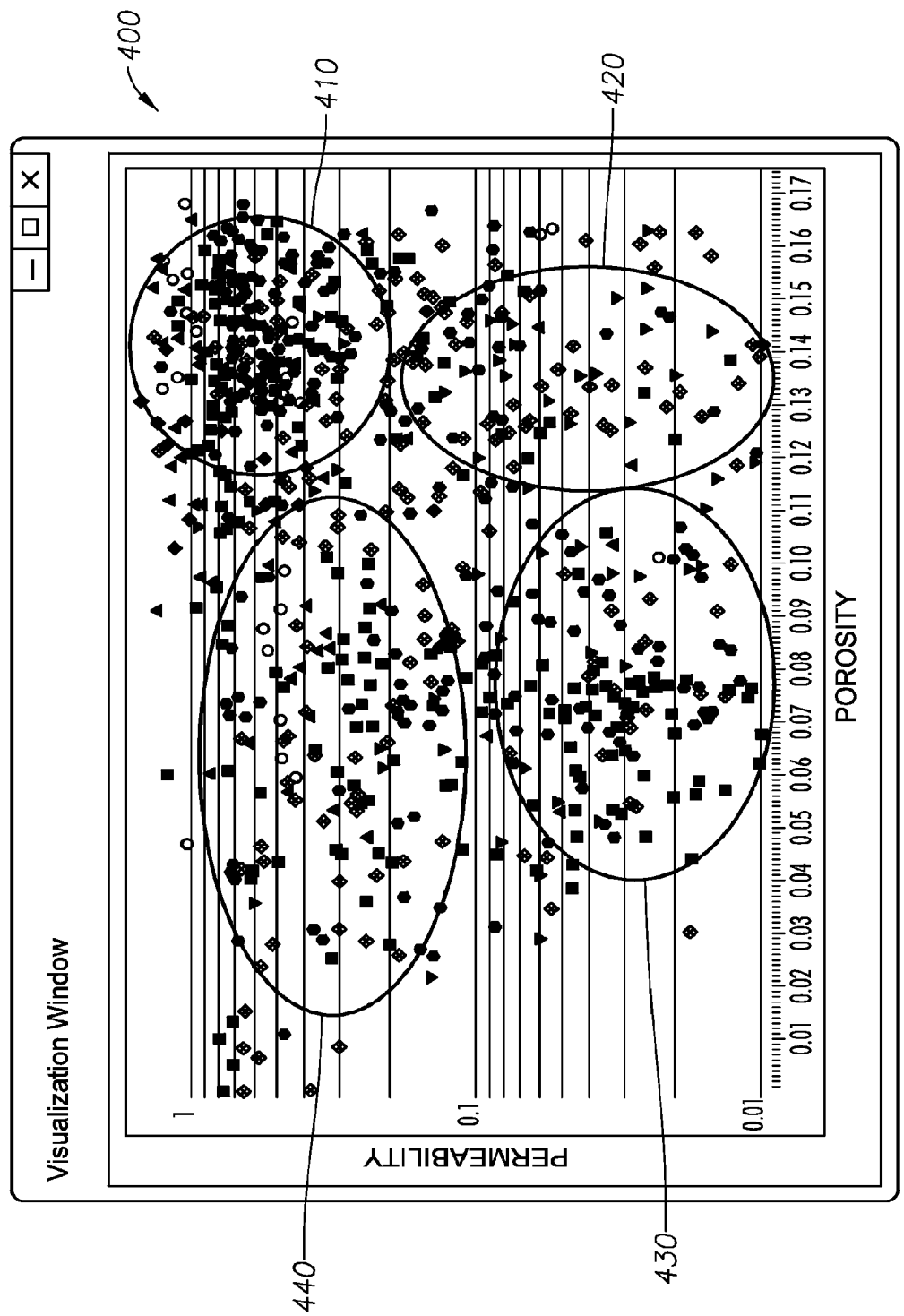
FIG. 4 illustrates another exemplary view of the cross-plot visualization, in which non-linear petrofacies are defined according to circular shapes drawn by the user via the GUI.

Similarly, FIG. 4 illustrates an exemplary cross-plot visualization 400 of the selected petrophysical properties, in which non-linear petrofacies may be defined according to circular shapes drawn by the user via the GUI. In the example shown in FIG. 4, cross-plot visualization 400 includes selection areas 410, 420, 430, and 440 corresponding to different circular shapes (e.g., circles or ovals in the form of monogons or digons) drawn by the user within cross-plot visualization 400 as presented via the GUI. As in cross-plot visualization 300, each selection area within cross-plot visualization 400 may need to include at least two data points in order to qualify (or be recognized by the GUI) as a valid flow regime selection.

Figure 5:
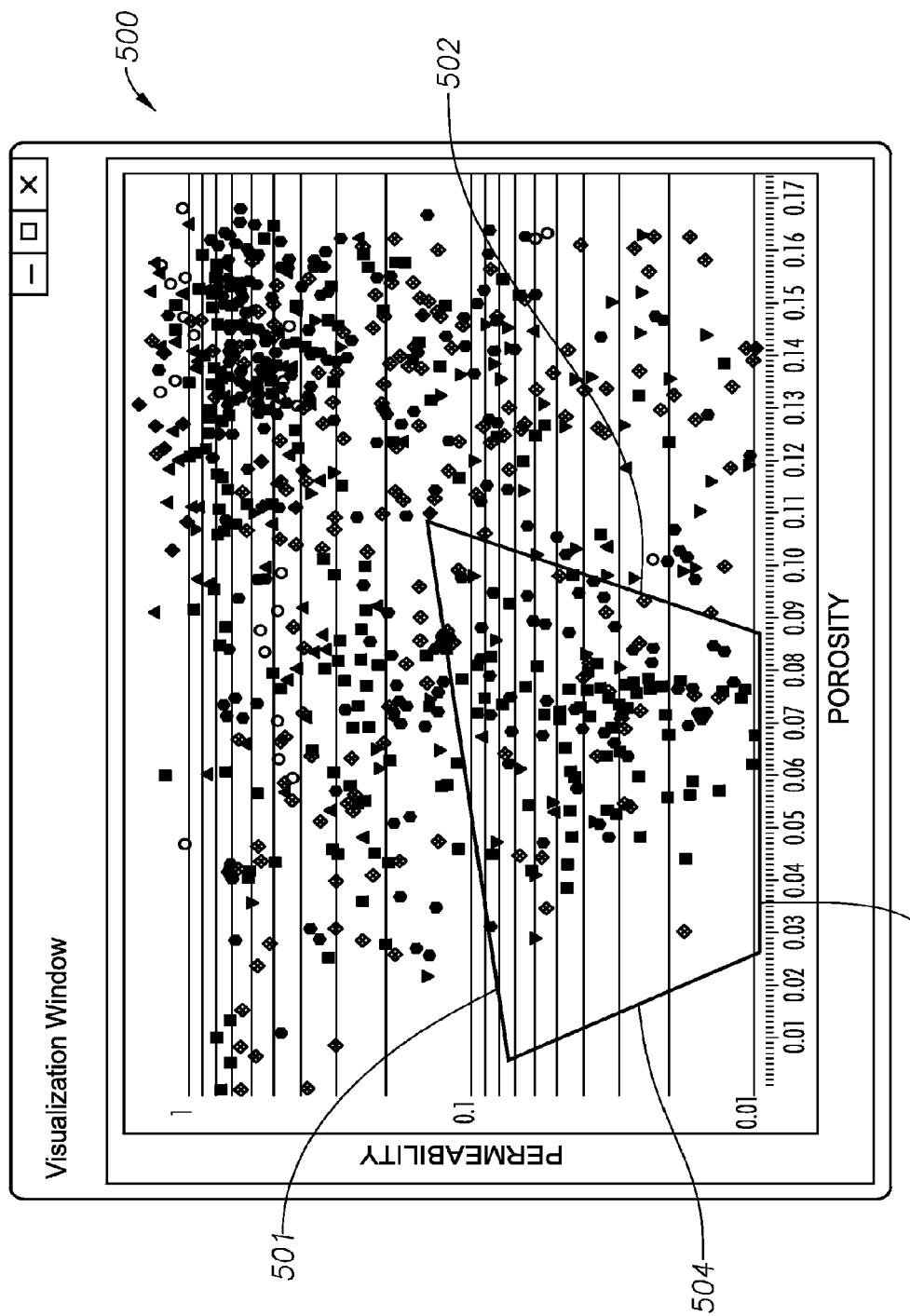
FIG. 5 illustrates yet another exemplary view of the cross-plot visualization, in which a non-linear petrofacies is defined according to a polygon formed by a series of line segments drawn by the user via the GUI.

FIG. 5 illustrates an example of a cross-plot visualization 500 for defining non-linear petrofacies based on a series of line segments 501, 502, 503, and 504 drawn by the user via the GUI. In an example, each of line segments 501-504 may be drawn separately in the Cartesian space of the visualized cross-plot at different times. In response to receiving input from the user drawing at least three separate line segments, the GUI may check to determine whether the line segments can be connected from end to end in series so as to form a closed polygon. In an embodiment, each line segment can be described by Equation (1) of the form:

$$y - y_0 - \frac{y_1 - y_0}{x_1 - x_0}(x - x_0) = 0 \qquad (1)$$

The slope (referred to as "m") of the line may be defined by the expression $$\frac{y_1 - y_0}{x_1 - x_0}$$

in the above equation and may be determined from the two endpoints of the line segment drawn in the visualized cross-plot. Using the values of $x_0$, $y_0$, and m, the y intercept (which may be referred to as "b") can then be determined by setting the value of x to zero. This yields an equation of the form y=mx+b, which can be used to define each line segment according to a minimum/maximum value of the independent variable x and dependent variable y associated with the properties being plotted in the cross-plot. Thus, each of line segments 501-504 in FIG. 5 may be represented by its respective line equation that expresses its slope and possible y-axis intercept. For example, line segments 501-504 may be represented by Equations (2-5), respectively:

$$\{y^1 = m^1 x^1 + b^1 | x_{min}^1 < x^1 < x_{max}^1; y_{min}^1 < y^1 < y_{max}^1\} \quad (2)$$

$$\{y^2 = m^2 x^2 + b^2 | x_{min}^2 < x^2 < x_{max}^2; y_{min}^2 < y^2 < y_{max}^2\} \quad (3)$$

$$\{y^3 = m^3 x^3 + b^3 | x_{min}^3 < x^3 < x_{max}^3; y_{min}^3 < y^3 < y_{max}^3\} \quad (4)$$

$$\{y^4 = m^4 x^4 + b^4 | x_{min}^4 < x^4 < x_{max}^4; y_{min}^4 < y^4 < y_{max}^4\} \quad (5)$$

where the superscript refers to the Nth line segment defined by the user for the $\{i=1 \ldots N\}$ line segments that form the polygon, and the global/local minima/maxima of the line is referred to by "min" and "max," respectively. The equation of each line segment may be bounded by, for example, the user's selection of a predetermined bounding value via the GUI. For a completely vertical user drawn line, this equation would be x=N; where N is a real number. The corresponding equation of a completely horizontal user drawn line would be y=N; where N is a real number.

In an embodiment, data points and associated values in the cross-plot can be checked to determine their existence within the boundaries of the polygon formed from the connected line segments. This check may be performed through a process of elimination in which selected data points that are located within a predetermined distance of the polygon may be checked and filtered out based on the global range of minimum and maximum values associated with the area as a whole as well as the local range of minima/maxima values associated with each line segment forming a side or edge of the polygon. For example, such filtering process may include first checking the inclusion of data points representing data values that fall within the global minima/maxima value range characterizing the polygon as a whole and then checking the local minima/maxima range characterizing the individual line segments that connect to form the polygon. The data values that spatially adhere to all minima/maxima may be determined to correspond to the constructed polygon in this example and therefore, be added to a collection of identified data points to be associated with the corresponding non-linear petrofacies region. The other data values may be negated. This process may then be repeated to generate other polygons for the remaining data values.

Figure 6:
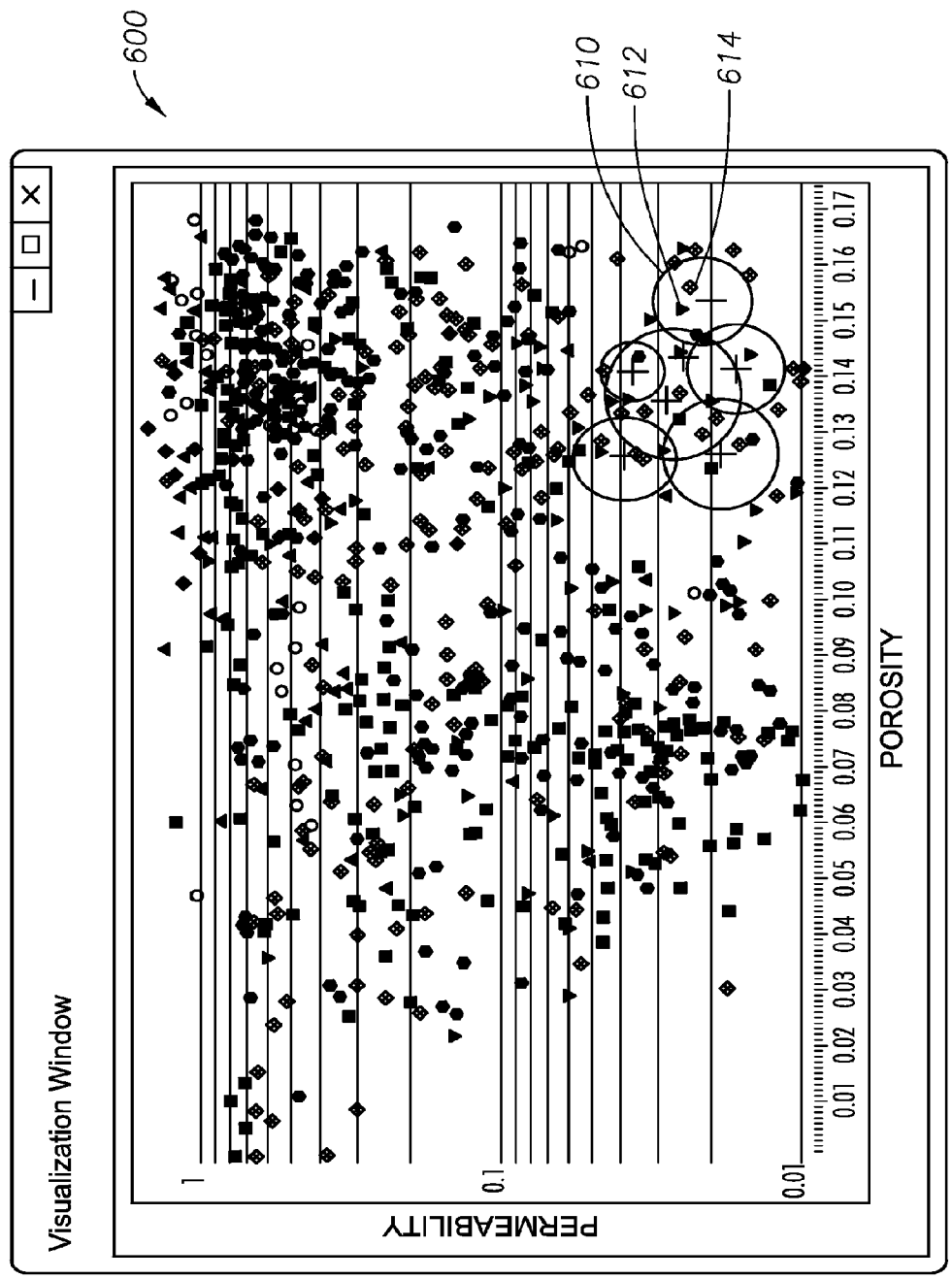
FIG. 6 illustrates yet another exemplary view of the cross-plot visualization, in which non-linear petrofacies are defined according to a point-by-point selection of data values by the user via the GUI.

FIG. 6 illustrates an example of a cross-plot visualization 600 for defining non-linear petrofacies regions based on a point-by-point selection of data points within the cross-plot visualization. In this example, the user repeatedly performs a single data point selection of at least desired data points which are to be attributed to a petrofacies. For example, the user's selection of data points 612 and 614 may be attributed to a nonlinear petrofacies region 610. In some implementations, upon each selection the data point is added to a digital "collection receptacle" or virtual container for the particular non-linear petrofacies region. The user may further enhance the selection process by, for example, initiating a radial search around a selected data point for additional data points within cross-plot visualization 600 that are located nearby or within a predetermined search radius of the user-selected data point. For example, the "+" symbol in the center of region 610 may denote the location of an initial data point selected by the user for a petrofacies group comprising an exclusive collection of points located within a predetermined proximity/search radius of the initial data point. Accordingly, the circular outline of region 610 may represent the boundaries of a data point selection area centered around the user-selected data point for automatically finding and adding nearby data points located within the search radius to the corresponding petrofacies group.

Figure 7:
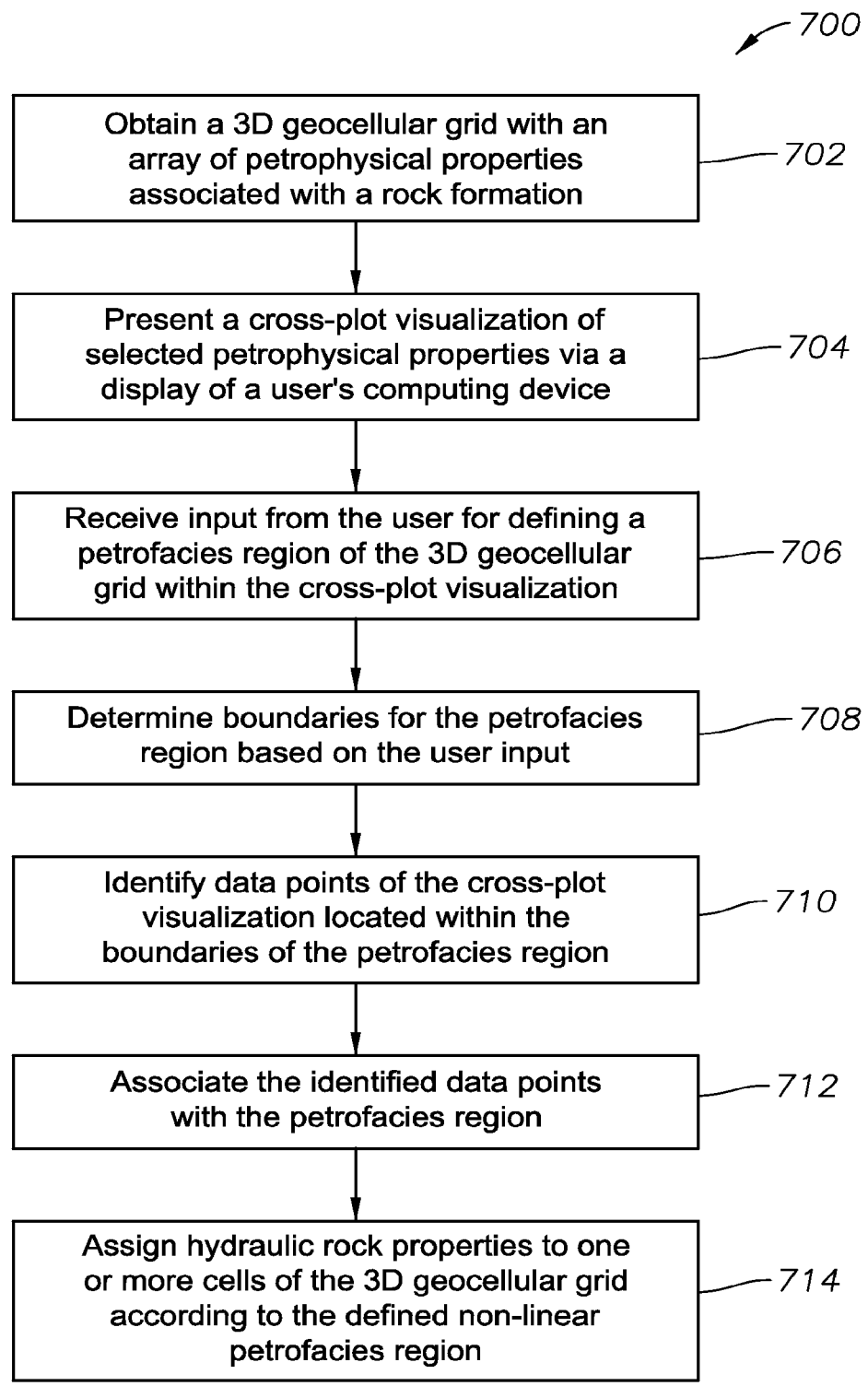
FIG. 7 is a flowchart of an exemplary method for defining non-linear petrofacies in a reservoir simulation model.

FIG. 7 is a flowchart of an exemplary method 700 for defining non-linear petrofacies for a reservoir simulation model. As shown in FIG. 7, method 700 includes steps 702, 704, 706, 708, 710, 712, and 714. For purposes of discussion, method 700 will be described using system 100 of FIG. 1, as described above. However, method 700 is not intended to be limited thereto.

Method 700 begins in step 702, which includes obtaining a 3D geocellular grid having an array of petrophysical properties associated with an underground reservoir rock formation. In step 704, a cross-plot visualization of selected petrophysical properties from the array is presented via a display of a computing device. As described above, the cross-plot visualization may include a plurality of data points representing values of the selected petrophysical properties. In an embodiment, the cross-plot visualization may be displayed within a visualization window of a GUI (e.g., GUI 130 of FIG. 1, as described above). A user of the computing device may use a user input device (e.g., a mouse, keyboard, or touch-screen) coupled to the computing device in order to interact with the visualization window and the cross-plot visualization presented therein.

In step 706, input for defining a petrofacies region of the 3D geocellular grid may be received from the user of the computing device. The input received from the user may be based on the user's interaction with the cross-plot visualization. As described above, the user may interact with the cross-plot visualization via the GUI by selecting a group of at least two data points within an area of the cross-plot visualization. The user may select the area and data points in various ways. In an example, the user may select the area by drawing a circle, oval, or polygon of any size or shape around the group of data points directly within the cross-plot visualization, as shown in cross-plot visualizations 300 and 400 of FIGS. 3 and 4, respectively, and described above. In a further example, the user may draw a series of line segments that form a polygon delineating the selected area and the data points enclosed by the area within the cross-plot visualization, as shown in cross-plot visualization 500 of FIG. 5 and described above. In yet a further example, the user may select desired data points to be attributed to the petrofacies region on an individual basis, e.g., by repeatedly selecting individual data points in an area of the cross-plot visualization, as shown in cross-plot visualization 600 of FIG. 6 and described above.

By using the above-described data point selection techniques, the user may be able to specify non-linear relationships between the selected petrophysical properties according to the corresponding user-selected data points within the cross-plot visualization. As described above, the petrofacies region of the 3D geocellular grid may be defined according to the non-linear relationships represented by the user-selected area.

Upon receiving the input from the user in step 706, method 700 proceeds to step 708, in which boundaries of the petrofacies region are determined based on the received iii input. For example, the boundaries of the region may be correspond to the outline of the data point selection area (e.g., polygon or circular shape) drawn by the user within the cross-plot visualization. Once the boundaries are determined, method 700 proceeds to step 710, which includes identifying data points of the cross-plot visualization that are within the boundaries of the petrofacies region or corresponding selection area drawn by the user. As described above, data points within a predetermined distance of this area may be checked to determine whether or not they belong to the drawn selection area and therefore be attributed to the corresponding non-linear petrofacies region.

In an example, for a selection area drawn by the user in the form of a polygon, such a determination may involve first identifying data points located within the global minima/maxima extents of the user-drawn selection area (e.g., polygon) are checked first followed by the local minima/maxima extents that characterize the individual line segments that form the polygon. In this example, the boundaries of the defined non-linear petrofacies region may correspond to both the global and local minima/maxima extents associated with the polygon. As described above, the data points that are determined to spatially adhere to all global and local minima/maxima correspond to the constructed polygon and the other data values may be excluded.

The identified data points are then associated with the petrofacies region in step 712. While not shown in FIG. 7, the above-described data-point selection and assignment process may then be repeated to define additional petrofacies regions for groups of remaining data points within the cross-plot visualization. As described above, this may include receiving additional user input selecting groups of data points within additional data point selection areas (e.g., polygons) drawn by the user within the cross-plot visualization and if necessary, automatically generating a default or catch-all selection area for any remaining data points that are not already included within an existing selection area drawn by the user. In step 714, hydraulic rock properties are assigned to one or more cells of the 3D geocellular grid according to the defined non-linear petrofacies regions. In an embodiment, step 714 may include assigning appropriate relative permeability and/or capillary pressure curves to each cell of the 3D geocellular grid according to the user-defined non-linear petrofacies region.

Figure 8:
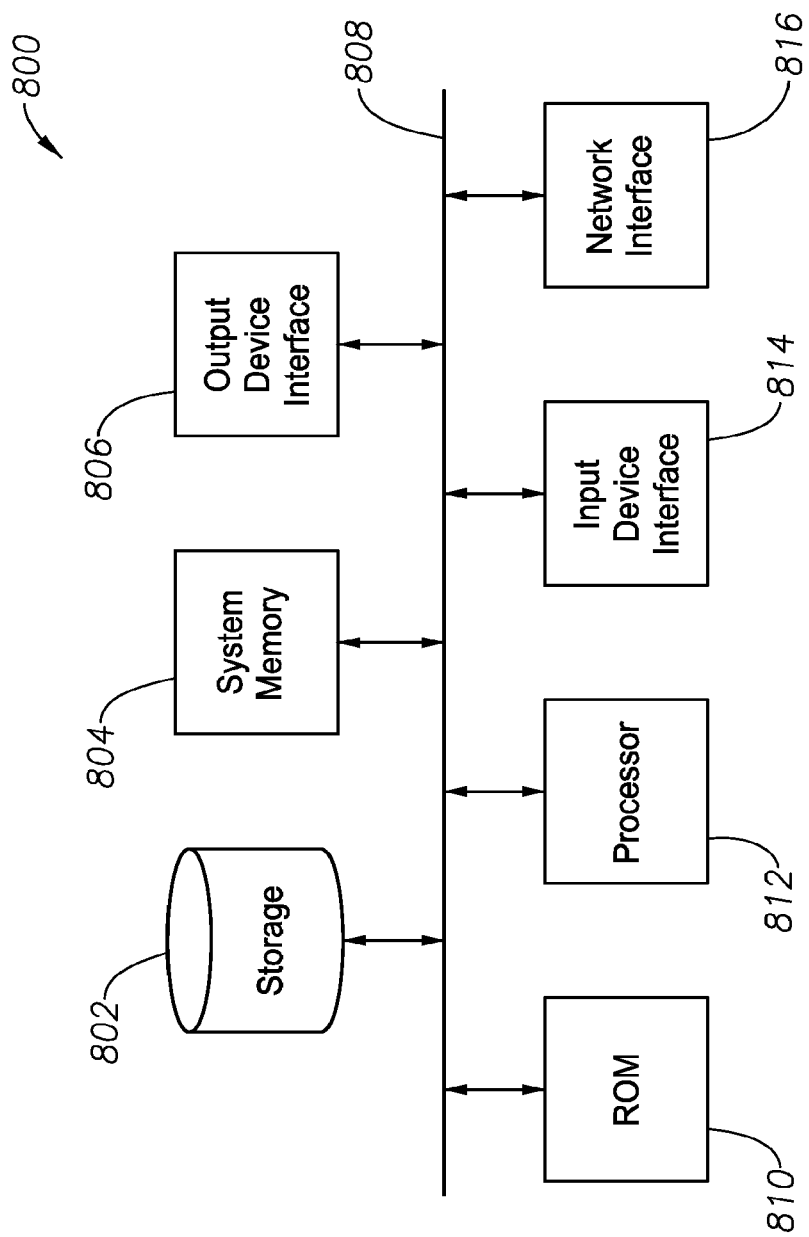
FIG. 8 is a block diagram of an exemplary computer system in which embodiments of the present disclosure may be implemented.

FIG. 8 is a block diagram of an exemplary computer system 800 in which embodiments of the present disclosure may be implemented. For example, the components of system 100 of FIG. 1 in addition to the steps of method 700 of FIG. 7, as described above, may be implemented using system 800. System 800 can be a computer, phone, PDA, or any other type of electronic device. Such an electronic device includes various types of computer readable media and interfaces for various other types of computer readable media. As shown in FIG. 8, system 800 includes a permanent storage device 802, a system memory 804, an output device interface 806, a system communications bus 808, a read-only memory (ROM) 810, processing unit(s) 812, an input device interface 814, and a network interface 816.

Bus 808 collectively represents all system, peripheral, and chipset buses that communicatively connect the numerous internal devices of system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of system 800. Permanent storage device 802, on the other hand, is a read-and-write memory device. This device is a non-volatile memory unit that stores instructions and data even when system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. For example, the various memory units include instructions for computer aided pipe string design based on existing string designs in accordance with some implementations. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the system 800. Input devices used with input device interface 814 include, for example, alphanumeric, QWERTY, or T9 keyboards, microphones, and pointing devices (also called "cursor control devices"). Output device interfaces 806 enables, for example, the display of images generated by the system 800. Output devices used with output device interface 806 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 8, bus 808 also couples system 800 to a public or private network (not shown) or combination of networks through a network interface 816. Such a network may include, for example, a local area network ("LAN"), such as an Intranet, or a wide area network ("WAN"), such as the Internet. Any or all components of system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of method 700 of FIG. 7, as described above, may be implemented using system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for defining non-linear petrofacies in a reservoir simulation model. Advantages of the present disclosure include, but are not limited to, providing a variety of data selection techniques for enabling data analysis and subset creation based on the identification of non-linear relationships within a set of data. The disclosed data selection techniques may allow, for example, users of earth modeling and reservoir simulation applications to seamlessly transition between modeling and simulation workflows, e.g., as part of a synergistic workflow provided in a cross-domain platform for earth engineering. As described above, embodiments enable such users to perform non-linear grid property selections through multiple mechanisms and thereby characterize petrofacies in a reservoir simulator for modeling hydraulic rock properties as flow units in a reservoir simulation model. In addition to the synergy between earth modeling and reservoir simulation, it should be appreciated that embodiments may also be applied to other types of data analysis and property subset selection workflows.

In one embodiment of the present disclosure, a computer-implemented method for defining non-linear petrofacies for a reservoir simulation model includes: obtaining a three-dimensional (3D) geocellular grid with an array of petrophysical properties representing a reservoir rock formation; presenting, via a display of a computing device, a cross-plot visualization of selected petrophysical properties from the array, the cross-plot visualization including a plurality of data points representing values of the selected petrophysical properties; receiving, from a user of the computing device, input for defining a non-linear petrofacies region of the 3D geocellular grid within the presented cross-plot visualization; determining boundaries for the non-linear petrofacies region within the cross-plot visualization based on the input received from the user; identifying data points in the plurality of data points of the cross-plot visualization that are within the boundaries of the petrofacies region; associating the identified data points with the petrofacies region; and assigning hydraulic rock properties to one or more cells of the 3D geocellular grid based on the data points associated with the petrofacies region.

In further embodiment, the petrofacies region corresponds to an area of the cross-plot visualization selected by the user, and a size and shape of the user-selected area is based on the input received from the user via a user input device coupled to the computing device. In yet a further embodiment, the user-selected area is a circular-shaped selection area including at least two of the plurality of data points within the cross-plot visualization. In yet a further embodiment, the user-selected area is a polygonal-shaped selection area including at least two of the plurality of data points within the cross-plot visualization. In yet a further embodiment, the polygonal-shaped selection area is formed based on a series of line segments drawn by the user within the cross-plot visualization using the user input device, each line segment corresponding to a side of the polygonal-shaped area. In yet a further embodiment, the series of line segments includes at least three line segments for forming the polygonal-shaped selection area with a minimum of three sides.

In yet a further embodiment, determining boundaries of the petrofacies region includes determining a local range of minimum and maximum values of the selected petrophysical properties associated with each line segment based on data points within the cross-plot visualization associated with the line segment and determining a global range of minimum and maximum values of the selected petrophysical properties for the polygonal-shaped selection area, based on the local range of minimum and maximum values associated with each line segment. Further, identifying data points in the plurality of data points of the cross-plot visualization includes selecting data points that are located within a predetermined distance of each line segment and for each of the selected data points: determining whether the selected data point represents values of the selected petrophysical properties that are within the local range of minimum and maximum values determined for each line segment and the global range of minimum and maximum values determined for the polygonal-shaped selection area as a whole; when the selected data point is determined to represent values within the local range or global range of minimum and maximum values, adding the selected data point to a collection of identified data points to be associated with the non-linear petrofacies region; and when the selected data point is determined not to represent values within the local range or global range of minimum and maximum values, excluding the data point from the collection of identified data points.

In yet a further embodiment, receiving input from the user comprises receiving input from the user selecting at least one of the plurality of data points, determining boundaries of the petrofacies region comprises determining a radius for a selection area within the cross-plot visualization relative to the user-selected data point, and identifying data points comprises identifying data points located within the determined radius of the selection area. In yet a further embodiment, the selected petrophysical properties include an absolute permeability and a porosity of the rock formation represented by the 3D geocellular grid, and the assigned hydraulic rock properties include a relative permeability curve. In yet a further embodiment, the assigned hydraulic rock properties further include a capillary pressure curve.

In another embodiment of the present disclosure, a system for defining non-linear petrofacies for a reservoir simulation model includes at least one processor and a memory coupled to the processor has instructions stored therein, which when executed by the processor, cause the processor to perform functions, including functions to: obtain a three-dimensional (3D) geocellular grid with an array of petrophysical properties representing a reservoir rock formation; present, via a display of a computing device, a cross-plot visualization of selected petrophysical properties from the array, the cross-plot visualization including a plurality of data points representing values of the selected petrophysical properties; receive, from a user of the computing device, input for defining a non-linear petrofacies region of the 3D geocellular grid within the presented cross-plot visualization; determine boundaries for the non-linear petrofacies region within the cross-plot visualization based on the input received from the user; identify data points in the plurality of data points of the cross-plot visualization that are within the boundaries of the petrofacies region; associate the identified data points with the petrofacies region; and assign hydraulic rock properties to one or more cells of the 3D geocellular grid based on the data points associated with the petrofacies region.

In yet another embodiment of the present disclosure, a computer-readable storage medium has instructions stored therein, which when executed by a computer cause the computer to perform a plurality of functions, including functions to: obtain a three-dimensional (3D) geocellular grid with an array of petrophysical properties representing a reservoir rock formation; present, via a display of a computing device, a cross-plot visualization of selected petrophysical properties from the array, the cross-plot visualization including a plurality of data points representing values of the selected petrophysical properties; receive, from a user of the computing device, input for defining a non-linear petrofacies region of the 3D geocellular grid within the presented cross-plot visualization; determine boundaries for the non-linear petrofacies region within the cross-plot visualization based on the input received from the user; identify data points in the plurality of data points of the cross-plot visualization that are within the boundaries of the petrofacies region; associate the identified data points with the petrofacies region; and assign hydraulic rock properties to one or more cells of the 3D geocellular grid based on the data points associated with the petrofacies region.

While specific details about the above embodiments have been described, the above hardware and software descriptions are intended merely as example embodiments and are not intended to limit the structure or implementation of the disclosed embodiments. For instance, although many other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method for defining non-linear petrofacies for a reservoir simulation model, the method comprising:
    obtaining a three-dimensional (3D) geocellular grid with an array of petrophysical properties representing a reservoir rock formation;
    presenting, via a display of a computing device, a cross-plot visualization of selected petrophysical properties from the array, the cross-plot visualization including a plurality of data points representing values of the selected petrophysical properties;
    receiving, from a user of the computing device, input for defining a non-linear petrofacies region of the 3D geocellular grid within the presented cross-plot visualization;
    determining, by the computing device, boundaries for the non-linear petrofacies region within the cross-plot visualization based on the input received from the user;
    identifying, by the computing device, data points in the plurality of data points of the cross-plot visualization that are within the boundaries of the petrofacies region;
    associating, by the computing device, the identified data points with the petrofacies region; and
    assigning, by the computing device, hydraulic rock properties to one or more cells of the 3D geocellular grid based on the data points associated with the petrofacies region.

2. The method of claim 1, wherein the petrofacies region corresponds to an area of the cross-plot visualization selected by the user, and a size and shape of the user-selected area is based on the input received from the user via a user input device coupled to the computing device.

3. The method of claim 2, wherein the user-selected area is a circular-shaped selection area including at least two of the plurality of data points within the cross-plot visualization.

4. The method of claim 2, wherein the user-selected area is a polygonal-shaped selection area including at least two of the plurality of data points within the cross-plot visualization.

5. The method of claim 4, wherein the polygonal-shaped selection area is formed based on a series of line segments drawn by the user within the cross-plot visualization using the user input device, each line segment corresponding to a side of the polygonal-shaped area.

6. The method of claim 5, wherein the series of line segments includes at least three line segments for forming the polygonal-shaped selection area with a minimum of three sides.

7. The method of claim 5, wherein:
    determining boundaries of the petrofacies region comprises:
        determining a local range of minimum and maximum values of the selected petrophysical properties associated with each line segment based on data points within the cross-plot visualization associated with the line segment; and
        determining a global range of minimum and maximum values of the selected petrophysical properties for the polygonal-shaped selection area, based on the local range of minimum and maximum values associated with each line segment, and
    identifying data points in the plurality of data points of the cross-plot visualization comprises:
        selecting data points that are located within a predetermined distance of each line segment;
        for each of the selected data points:
            determining whether the selected data point represents values of the selected petrophysical properties that are within the local range of minimum and maximum values determined for each line segment and the global range of minimum and maximum values determined for the polygonal-shaped selection area as a whole;
            when the selected data point is determined to represent values within the local range or global range of minimum and maximum values, adding the selected data point to a collection of identified data points to be associated with the non-linear petrofacies region; and
            when the selected data point is determined not to represent values within the local range or global range of minimum and maximum values, excluding the data point from the collection of identified data points.

8. The method of claim 1, wherein receiving input from the user comprises receiving input from the user selecting at least one of the plurality of data points, determining boundaries of the petrofacies region comprises determining a radius for a selection area within the cross-plot visualization relative to the user-selected data point, and identifying data points comprises identifying data points located within the determined radius of the selection area.

9. The method of claim 1, wherein the selected petrophysical properties include an absolute permeability and a porosity of the rock formation represented by the 3D geocellular grid, and the assigned hydraulic rock properties include a relative permeability curve.

10. The method of claim 9, wherein the assigned hydraulic rock properties further include a capillary pressure curve.

11. A system for defining non-linear petrofacies for a reservoir simulation model, the system comprising:
   at least one processor; and
   a memory coupled to the processor having instructions stored therein, which when executed by the processor, cause the processor to perform functions, including functions to:
   obtain a three-dimensional (3D) geocellular grid with an array of petrophysical properties representing a reservoir rock formation;
   present, via a display coupled to the processor, a cross-plot visualization of selected petrophysical properties from the array, the cross-plot visualization including a plurality of data points representing values of the selected petrophysical properties;
   receive, from a user of the computing device, input for defining a non-linear petrofacies region of the 3D geocellular grid within the presented cross-plot visualization;
   determine boundaries for the non-linear petrofacies region within the cross-plot visualization based on the input received from the user;
   identify data points in the plurality of data points of the cross-plot visualization that are within the boundaries of the petrofacies region;
   associate the identified data points with the petrofacies region; and
   assign hydraulic rock properties to one or more cells of the 3D geocellular grid based on the data points associated with the petrofacies region.

12. The system of claim 11, wherein the petrofacies region corresponds to an area of the cross-plot visualization selected by the user, and a size and shape of the user-selected area is based on the input received from the user via a user input device coupled to the processor.

13. The system of claim 12, wherein the user-selected area is a circular-shaped selection area including at least two of the plurality of data points within the cross-plot visualization.

14. The system of claim 12, wherein the user-selected area is a polygonal-shaped selection area including at least two of the plurality of data points within the cross-plot visualization.

15. The system of claim 14, wherein the polygonal-shaped selection area is formed based on a series of at least three line segments drawn by the user within the cross-plot visualization using the user input device, each line segment corresponding to a side of the polygonal-shaped area.

16. The system of claim 15, wherein the functions performed by the processor include functions to:
   determine a local range of minimum and maximum values of the selected petrophysical properties associated with each line segment based on data points within the cross-plot visualization associated with the line segment;
   determine a global range of minimum and maximum values of the selected petrophysical properties for the polygonal-shaped selection area, based on the local range of minimum and maximum values associated with each line segment;
   select data points that are located within a predetermined distance of each line segment;
   for each of the selected data points:
      determine whether the selected data point represents values of the selected petrophysical properties that are within the local range of minimum and maximum values determined for each line segment and the global range of minimum and maximum values determined for the polygonal-shaped selection area as a whole;
      when the selected data point is determined to represent values within the local range or global range of minimum and maximum values, add the selected data point to a collection of identified data points to be associated with the non-linear petrofacies region; and
      when the selected data point is determined not to represent values within the local range or global range of minimum and maximum values, exclude the data point from the collection of identified data points.

17. The system of claim 11, wherein the functions performed by the processor include functions to:
   receive input from the user selecting at least one of the plurality of data points;
   determine a radius for a selection area within the cross-plot visualization relative to the user-selected data point; and
   identify data points located within the determined radius of the selection area.

18. The system of claim 11, wherein the selected petrophysical properties include an absolute permeability and a porosity of the rock formation represented by the 3D geocellular grid, and the assigned hydraulic rock properties include a relative permeability curve.

19. The system of claim 18, wherein the assigned hydraulic rock properties further include a capillary pressure curve.

20. A non-transitory computer-readable storage medium having instructions stored therein, which when executed by a computer cause the computer to perform a plurality of functions, including functions to:
   obtain a three-dimensional (3D) geocellular grid with an array of petrophysical properties representing a reservoir rock formation;
   present, via a display of the computer, a cross-plot visualization of selected petrophysical properties from the array, the cross-plot visualization including a plurality of data points representing values of the selected petrophysical properties;
   receive, from a user of the computing device, input for defining a non-linear petrofacies region of the 3D geocellular grid within the presented cross-plot visualization;
   determine boundaries for the non-linear petrofacies region within the cross-plot visualization based on the input received from the user;
   identify data points in the plurality of data points of the cross-plot visualization that are within the boundaries of the petrofacies region;

associate the identified data points with the petrofacies region; and assign hydraulic rock properties to one or more cells of the 3D geocellular grid based on the data points associated with the petrofacies region.

* * * * *

UNITED STATES PATENT AND TRADEMARK OFFICE
CERTIFICATE OF CORRECTION

PATENT NO. : 9,880,321 B2
APPLICATION NO. : 14/780471
DATED : January 30, 2018
INVENTOR(S) : Travis St. George Ramsay Page 1 of 1

It is certified that error appears in the above-identified patent and that said Letters Patent is hereby corrected as shown below:

In the Claims

Column 19, Line 31 Claim 11:
Delete "of the computing device"

Column 20, Line 58 Claim 20:
Delete "of the computing device"

Signed and Sealed this
Fifteenth Day of May, 2018

Andrei Iancu
*Director of the United States Patent and Trademark Office*